(12) United States Patent
Otter

(10) Patent No.: US 10,852,181 B2
(45) Date of Patent: Dec. 1, 2020

(54) OPTICAL LIGHT DIFFUSING SYSTEM

(71) Applicant: Nederlandse Organisatie voor toegepast-natuurwetenschappelijk onderzoek TNO, 's-Gravenhage (NL)

(72) Inventor: Gerard Christiaan Jurjen Otter, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 156 days.

(21) Appl. No.: 16/081,650

(22) PCT Filed: Mar. 6, 2017

(86) PCT No.: PCT/NL2017/050131
§ 371 (c)(1),
(2) Date: Aug. 31, 2018

(87) PCT Pub. No.: WO2017/150979
PCT Pub. Date: Sep. 8, 2017

(65) Prior Publication Data
US 2019/0011311 A1    Jan. 10, 2019

(30) Foreign Application Priority Data
Mar. 4, 2016 (EP) .................................. 16158832

(51) Int. Cl.
*G01J 1/04*     (2006.01)
*G02B 19/00*    (2006.01)
(Continued)

(52) U.S. Cl.
CPC .......... *G01J 1/0474* (2013.01); *G01J 1/0411* (2013.01); *G01J 1/0437* (2013.01); *G02B 5/02* (2013.01);
(Continued)

(58) Field of Classification Search
CPC ..... H04N 5/2254; G01J 1/0474; G01J 1/0437
See application file for complete search history.

(56) References Cited

U.S. PATENT DOCUMENTS 5,148,288 A    9/1992 Hannah
7,701,489 B1   4/2010 Christie et al.
(Continued)

FOREIGN PATENT DOCUMENTS

EP    1729172 A1    12/2006
WO    2008044931 A1  4/2008
WO    2014/076218 A1  5/2014

OTHER PUBLICATIONS

Jul. 4, 2017—PCT/NL2017/050131—ISR & WO.

*Primary Examiner* — Thanh Luu
(74) *Attorney, Agent, or Firm* — Banner & Witcoff, Ltd.

(57) ABSTRACT

An optical light diffusing system is provided that includes an optical diffuser that coverts incoming light into diffused light. To prevents mixing light from undesired directions in the diffuser, light form undesired direction is baffled before it reaches the diffuser. Baffling is performed with an array of micro lenses located in the optical path to the diffuser. An array of apertures is located between the array of micro lenses and the optical diffuser. Each micro lens is aligned with a corresponding aperture. The apertures are located substantially in a focal surface of the array of micro lenses. Optical baffles located between the array of micro lenses and the array of apertures, separates optically transparent volumes between different ones of the micro lenses and their corresponding apertures.

18 Claims, 4 Drawing Sheets

(51) Int. Cl.
*G02B 5/02* (2006.01)
*G02B 3/00* (2006.01)
(52) U.S. Cl.
CPC ........ *G02B 19/0076* (2013.01); *G02B 3/0006* (2013.01)

(56) References Cited

U.S. PATENT DOCUMENTS

| | | |
|---|---|---|
| 2003/0067690 A1 | 4/2003 | Terauchi et al. |
| 2006/0061861 A1 | 3/2006 | Munro et al. |
| 2006/0268404 A1* | 11/2006 | Hyobu .................. G03B 21/10 359/456 |
| 2011/0044046 A1 | 2/2011 | Abu-Ageel |
| 2015/0330607 A1* | 11/2015 | Di Trapani ........ G02B 19/0028 362/608 |

* cited by examiner

OPTICAL LIGHT DIFFUSING SYSTEM

CROSS-REFERENCE TO RELATED APPLICATIONS

This application is a U.S. National Stage application under 35 U.S.C. § 371 of International Application PCT/NL2017/050131 (published as WO 2017/150979 A1), filed Mar. 6, 2017, which claims the benefit of priority to Application EP 16158832.2, filed Mar. 4, 2016. Benefit of the filing date of each of these prior applications is hereby claimed. Each of these prior applications is hereby incorporated by reference in its entirety.

FIELD OF THE INVENTION

The invention relates to an optical light diffusing system and to a light detection system comprising such a an optical light diffusing system.

BACKGROUND

An optical diffuser may be used in a light detection system to make light intensity measurements by a light detector insensitive to the orientation of the light detector relative to the direction to the source of the light. The optical diffuser may be a reflective diffuser, for example in the form of a white surface (a Lambertian reflecting surface) used to reflect light from the source to the light detector, or a transmissive diffuser used to transmit light from the source to the light detector.

A problem with use of an optical diffuser for light intensity measurements it makes it difficult to limit the detected light to light from a selected source. When light from a plurality of sources enters the diffuser, the detected light becomes a mix of light from all these sources.

It is known to combine a diffuser with an optical baffle to enable source selection. The baffle serves to limit the range of source directions from which light can reach the diffuser. Conventionally, an optical baffle consists of a frustrated cone or cylinder with a black (non-reflective) inner surface, with the diffuser the opening at the narrow end of the cone, or one end of the cylinder. Unfortunately, such a baffle significantly contributes to the size and weight of the light detection system. This makes it difficult or at least costly to use optical diffusing light detection systems of this type. For example, in sunlight detection using a diffuser in satellites, the size of the baffle can be a cost driving factor.

Efforts have been made to reduce the size of baffles. For example, WO2008044931 (assigned to the present applicant, but unrelated to diffusing light detection) proposed to add a grid of walls within a cone shaped baffle to realize the same range of selected angles with a shorted baffle. However, such a baffle still has a considerable size and weight.

EP1729172 and US2006061861 disclose back-projection display screens wherein backlight from outside the projector is blocked from reaching the projection screen by means of an array of micro lenses and an array of pinholes near the focus of the micro lenses. The aperture parts are shaped into a truncated cone. Thus, the pinholes serve to transmit light from the direction of the projector and absorb other light.

As an option, these documents disclose use of light diffusing particles on the exit surface of the sheet that defines the pinholes or in the pinholes, in order to permit a display with a wider view angle, by widening the radiation angles at which light exits from the screen surface. In addition, diffusive material in the pinholes is disclosed in the pinholes to improve grain and speckle characteristics. The image resolution of such a back projection screen is limited by the number of apertures in the image area. Although the light diffusing particles widen the view angle from which the screen can be viewed, they do not reduce the resolution by blurring light from different apertures since they are located.

US20110044046 discloses a light source that uses wavelength conversion from violet source light to visible light. A feedback system with a detector that detects the converted light is used to control the source light intensity in order to obtain a predetermined visible light intensity. A phosphor, used as light conversion material, is provided on a surface of light diffusively reflective material that encloses an interior volume with one or more apertures for inputting violet source light into the interior volume and outputting converted visible light from the interior volume. The source light is converted to visible light in the phosphor, wherein the light is diffused. A diffuser may be added in the path of the received light beam to increase the cone angle.

As an option, a collimating plate and an optical element are used at the aperture to reflect a substantial amount of reflected source light back to the wavelength conversion layer, providing another chance for the source light to be converted. The collimating plate is used to ensure that source light and converted light get collimated compared to the light at the wavelength conversion layer. An embodiment of the collimating plate comprises an aperture plate, a micro-guide array and a micro lens array.

SUMMARY

Among others, it is an object to provide for an optical light diffusing system and for a light detection system that baffles light from directions outside a desired view range, and has a smaller size than conventional cone shaped baffles for baffling light from directions outside the same view range.

Conventionally, an optical light diffusing system for a light detection system serves to produce a detectable output light intensity that is insensitive to the direction to the source of light relative to the direction of the optical light diffusing system. In contrast, baffling light from directions outside the desired a view range is a form of sensitivity to the direction of the source. The object involves combining the two by providing for such baffling, while providing for insensitivity to the direction of the source within the range of directions that is not suppressed by baffling.

An optical diffusing light system according to claim 1 is provided. Moreover, an optical diffusing light detection system comprising such an optical diffusing light system and a detector is provided. In the optical diffusing light system an array of micro lenses with corresponding apertures located substantially at the position of a (virtual) focal surface of the micro lenses is used to prevent that light from directions outside a predetermined range reaches the diffuser. Preferably, the focal surface runs through the apertures. Light intensity at different locations on a focal surface of the micro lenses corresponds to light intensity received by the micro-lenses from different directions. Thus, only a very small volume is needed to prevent such light from reaching the diffuser. Effectively, each micro lens is used to form a telescope with the corresponding aperture as its field stop. Optical baffles between the array of micro lenses and the array of apertures prevent lateral light transmission between different telescopes.

Preferably, the diffuser is configured to average of light from a plurality of the apertures. Thus, the diffuser may be used to output averaged light from the plurality of the apertures to a detector. The averaging may be realized for example by mixing the light from the plurality of apertures before it reaches the diffuser and/or mixing the light from the plurality of apertures in the diffuser.

According to an aspect a use of the optical light diffusing system for calibrating the pixels of a camera is provided.

BRIEF DESCRIPTION OF THE DRAWING

These and other objects and advantageous aspect will become apparent from a detailed description of exemplary embodiments with reference to the following figures.

DETAILED DESCRIPTION OF EXEMPLARY EMBODIMENTS

Figure 1:
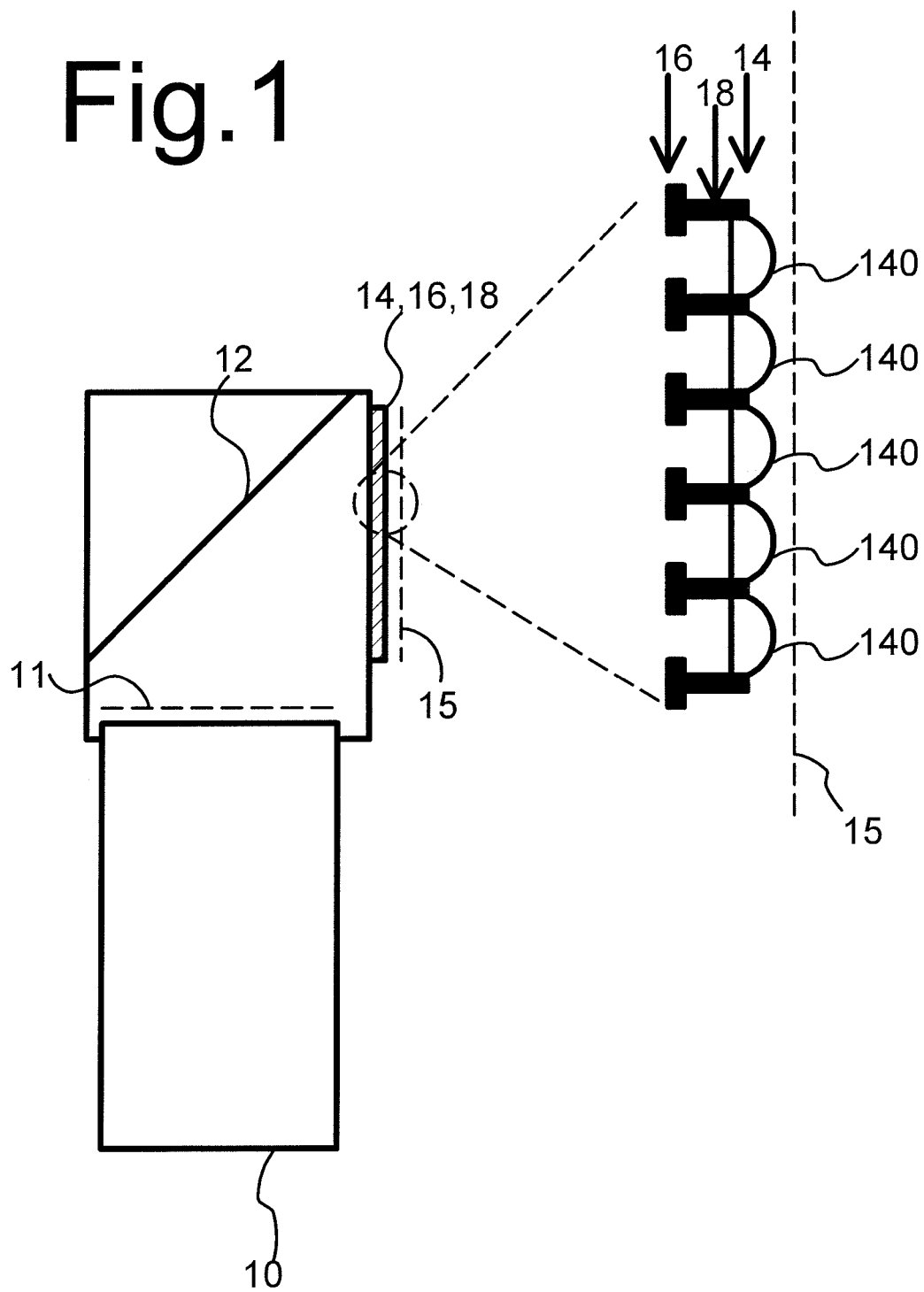
FIG. 1 shows an optical diffusing light detection system

FIG. 1 shows a schematic side view of an optical diffusing light detection system, comprising a light detector 10 and an optical light diffusing system with a diffuser 12, a micro lens array 14, an aperture array plate 16 and baffles 18. The combination of diffuser 12, micro lens array 14, aperture array plate 16 and baffles 18 may be located at a fixed position relative to detector 10. In another embodiment the system may provide for relative movement of detector 10 and this combination. A mechanism (not show) for moving the combination into and out of the optical path to detector 10 may be provided.

By way of example a small part of the micro lens array 14, an aperture array plate 16 and baffles 18 is shown enlarged. Herein some of the individual micro lenses 140 of micro lens array 14 are shown. Micro lenses 140 may have a focal distance of 1 mm, or in a range of 0.1-2 mm for example. The distance between apertures in aperture array plate 16 and micro lenses 14 substantially equals the focal distance of micro lenses 14 Preferably, the focal surface runs through the apertures or substantially so, i.e. within an accuracy allowed by manufacturing tolerances, e.g. at a distance from the micro lenses that differs not more than 20%, more preferably 10% and yet more preferably 5% from the focal distance.

Use is made of the effect that light intensity at different locations on the focal surface of lenses, such as the micro lenses 150, corresponds to light intensity received by the micro-lenses from different directions. With some blurring, this effect also occurs in planes that lie substantially, but not exactly in the focal surface, as long as the distance from the focal surface is sufficiently small compared to the focal distance, e.g. more than 20%, more preferably 10% and yet more preferably 5%.

The diameter of micro lenses 140 may be 1 mm, or in a range of 0.1-2 mm for example. In an embodiment micro lens array 14 contains at least a hundred and possibly much more, e.g. ten thousand micro lenses. The area of micro lens array 14 may be at least a hundred square millimeters and preferably more, e.g. ten thousand square millimeter.

An input area of the optical diffusing light detection system is indicated by a dashed line 15 and an output area of the optical diffusing light detection system is indicated by a dashed line 11. Input area 15 and output area 11 may be virtual surfaces, alternatively, output area 11 may be the front surface of light detector 10, and/or input area 15 and/or output area 11 may be transparent plates. The optical diffusing light detection system may comprise further optical elements such as filters (not shown) in front of input area 11 and/or behind output area 11.

Detector 10 may be a detector that detects an integral of light received over the entire output area. In another embodiment, detector 10 may be a camera or part of a camera. For example, the optical diffusing light detection system may be used to calibrate pixel sensitivity of pixels of a camera. In this case, a mechanism such as a motor driven rotatable or slicing platform may be used to move the combination of diffuser 12, micro lens array 14, aperture array plate 16 and baffles 18 into the light path to detector 10 (the camera) before calibration measurements are needed and to move it out of the light path after the calibration, before the camera is used to form images of the background through the light path.

Measurements of detected pixel values obtained when the combination is in the light path may be used to estimate calibration factors for the pixels. Alternatively, detector 10 may extend beyond output area 11 so that only part of the detected light comes from the combination. For example, the combination may be used to supply light to a part of the pixels of a camera to estimate calibration factors for all pixels using detected pixel values from this part. In this case it may not be needed to move the combination relative to the detector in order to switch between calibration and imaging. However, it should be appreciated that use of the combination of diffuser 12, micro lens array 14, aperture array plate 16 and baffles 18 is not limited to calibration.

By way of example, diffuser 12 is shown as a reflective diffuser in the form of a plate. This plate preferably has a substantially Lambertian reflective surface (e.g. a dull white plate). Diffuser 12 is located in a light path input area 15 to output area 11, where light detector 10 is located. Micro lens array 14 is located in this light path, between input area 15 and diffuser 12. Aperture array plate 16 is also located in this light path, between micro lens array 14 and diffuser 12.

As shown, diffuser 12 is located at a distance from aperture array plate 16 and hence from baffles 18 and micro lens array 14. In other words, there is a gap between aperture array plate 16 and diffuser 12 through which light propagates from the apertures in aperture array plate 16 to diffuser 12. Over at least the majority of the whole diffuser surface the distance in this gap is larger than the distance between the micro lenses 14 and the aperture array plate 16, i.e. larger than the focal distance of micro lenses 14 and preferably at least twice the focal distance or much more. The distance has the effect that light that reaches points on diffuser 12 from the apertures aperture array plate 16 is a mix of light from a plurality of different apertures in aperture array plate 16 at each of these points. Thus, also the light intensity of diffusively reflected light from diffuser 12 at each of these points is an average of light from a plurality of apertures.

Figure 2:
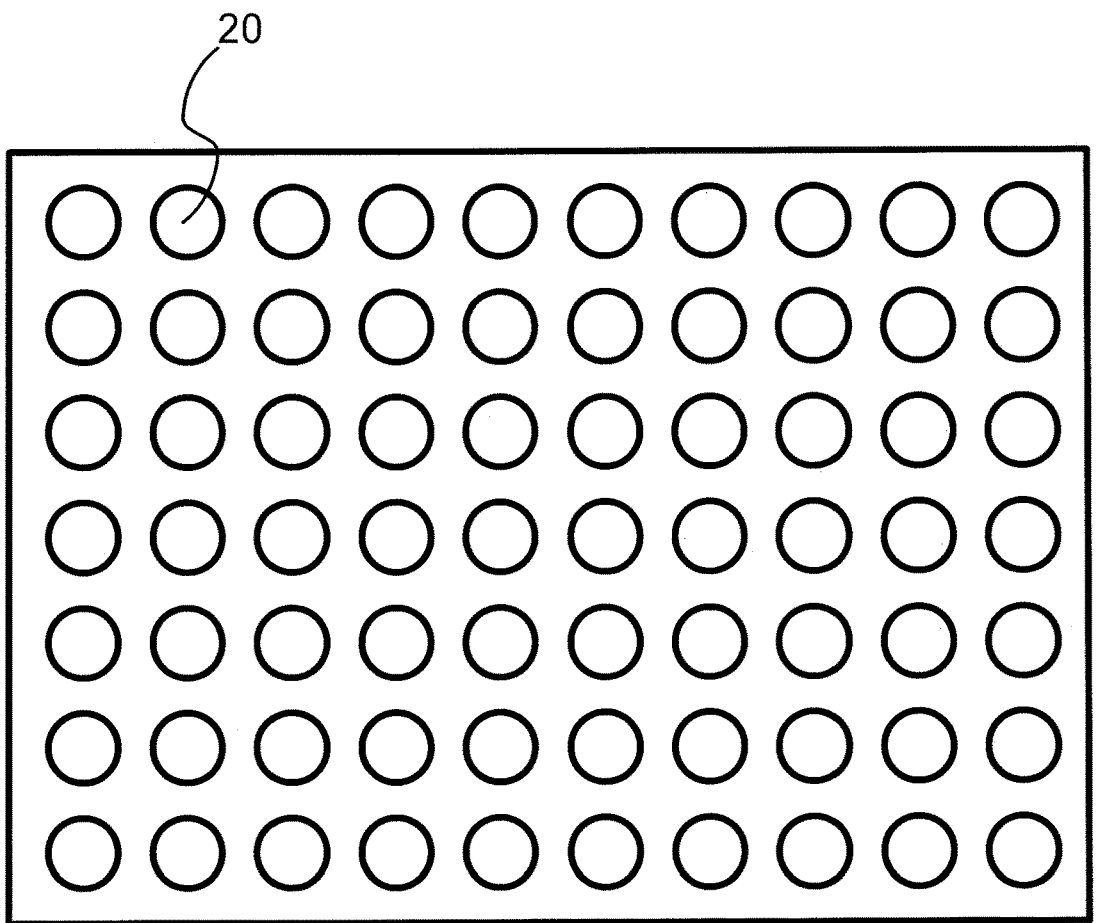
FIGS. 2, 2a show an aperture plate
Figure 2A:
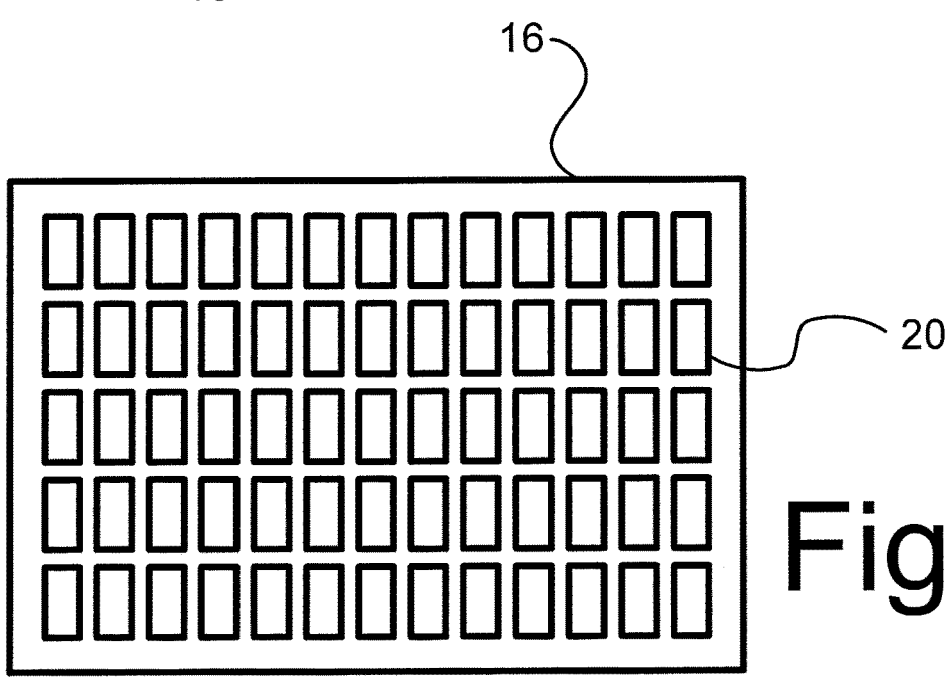

FIG. 2 shows a top view of an exemplary aperture array plate 16. Aperture array plate 16 comprises a layer of light blocking material, with a two dimensional array of apertures 20 through that layer. By way of example, apertures of circular shape are shown, but it should be appreciated that other shapes. FIG. 2a shows an example of an aperture array plate 16 wherein elongated apertures of rectangular shape are used, with different length and width. Alternatively other shapes may be used. The shape and dimensions of apertures depend on the desired range of directions from which light should be passed to diffuser 12. A diameter of a few tenths of a millimeter may be used for example. It may be advantageous to use apertures of elongated shape for example to allow for differences between the effect of different mechanisms of direction changes to an object (e.g. due to displacement and orientation changes of the system).

The pitch of the array (distance between the location of successive apertures) is preferably as small as possible in view of the size of micro lenses 14. The pitch may be about 1 mm for example, or in a range of 0.1 to 2 mm for example. Although FIG. 2 shows an embodiment wherein the apertures from a two-dimensionally periodic pattern with the same pitch in both directions along which the apertures are periodically repeated, this is not necessary. It is not even needed that apertures are arranged periodically, although this is preferred in order to make the pitch as small as possible.

Although examples of two-dimensional arrays have been shown, it should be appreciated that alternatively one dimensional arrays of apertures 20 and corresponding micro-lenses 140 may be used.

Micro lens array 14 comprises an arrangement of micro lenses 140, optically aligned apertures 20, i.e. located relative to apertures 20, so that each micro lens 140 has a corresponding aperture 20, at a location where the aperture receives light from the micro lens. Preferably, the relative location of each micro lens 140, and its corresponding aperture 20 is that same for each micro lens 140. For example, the center point of the aperture may be located on the optical axis of the micro lens 140. An optically transparent volume surrounds the optical axis between the micro lens 140 and its corresponding aperture 20. The optically transparent volume may be filled with optically transparent material, e.g. an extension of the body of the micro lens 140. Alternatively, the optically transparent volume may be an empty space in communication with the region between optical diffuser 12 and aperture array plate 16.

Baffles 18 surround the optically transparent volumes, blocking lateral light transmission to the volumes between all neighboring micro lenses 140 and their corresponding apertures 20. Preferably, baffles 18 have a non reflective or low reflective surface (e.g. black surface) to prevent reflection of the blocked light back into apertures 20.

The distance between the plane wherein apertures 20 are located and the plane wherein micro lenses 14 are located substantially equals the focal plane of micro lenses 14 (e.g. with a focal distance between 0.2-2 mm), so that apertures 20 lie in a virtual image plane where micro lenses 140 will form a virtual image of distant objects and this plane runs through the apertures. In this plane light intensity at different locations corresponds to light intensity received by the micro-lenses from different directions of incoming light at micro lenses 140, As noted, use is made of the effect that light intensity at different locations on the focal surface of lenses, such as the micro lenses 150, corresponds to light intensity received by the micro-lenses from different directions. With some blurring, this effect also occurs in planes that lie substantially, but not exactly in the focal surface, as long as the distance from the focal surface is sufficiently small compared to the focal distance, e.g. more than 20%, more preferably 10% and yet more preferably 5%.

Micro lenses 140 having a focal distance 1 mm, or in a range of in a range of 0.1-2 mm may be used for example. Micro lenses 140 and their corresponding apertures 20 form micro telescopes, each telescope with a respective one of the micro lenses 140 as its objective and the corresponding aperture 16 as a field stop.

Apertures 20 may have circular shape, but this is not necessary instead other aperture shapes may be used, such as rectangular (e.g. square) or elliptical apertures. In an embodiment all apertures have substantially the same shape and size (within manufacturing tolerance). This provides for sharply defined baffle angle range, but it may not be necessary. As the diffuser has the effect of averaging contributions from different angles, it also averages contributions from different apertures. Hence use of a combination of apertures with different shape and/or size still results in baffled diffusion results. A combination of apertures with different shape and/or size may be used to make the edges of the baffle angle range more gradual, e.g. to make the effect of misalignment more gradual. Similarly, the relative location of different micro lenses 140, and their corresponding apertures 20 may be different for different micro lenses 140, with a similar effect.

In operation, the location at which each micro lens 140 focuses light from a remote object in its corresponding aperture 20 is determined by the direction to the object. Therefore, the aperture 20 limits the range of directions to objects from which the aperture 20 passes light to diffuser 12. Baffles 18 prevent that light from objects in directions outside this range is passed to neighboring apertures 20. A range of directions of ten or twenty degrees wide may be passed for example. When circular apertures are used, directions that differ by less than a threshold angle of e.g. 5, or 10 degrees from a central angle are passed. When a differently shaped aperture is used, the angle range may be twenty degrees wide in the widest direction for example and ten degrees wide in the narrowest direction for example. Diffuser 12 diffusively reflects the light passed by apertures 20 to light detector 10. As a result of the diffuse reflection light from different directions is mixed as it passes from diffuser 12 to light detector 10.

Figure 3:
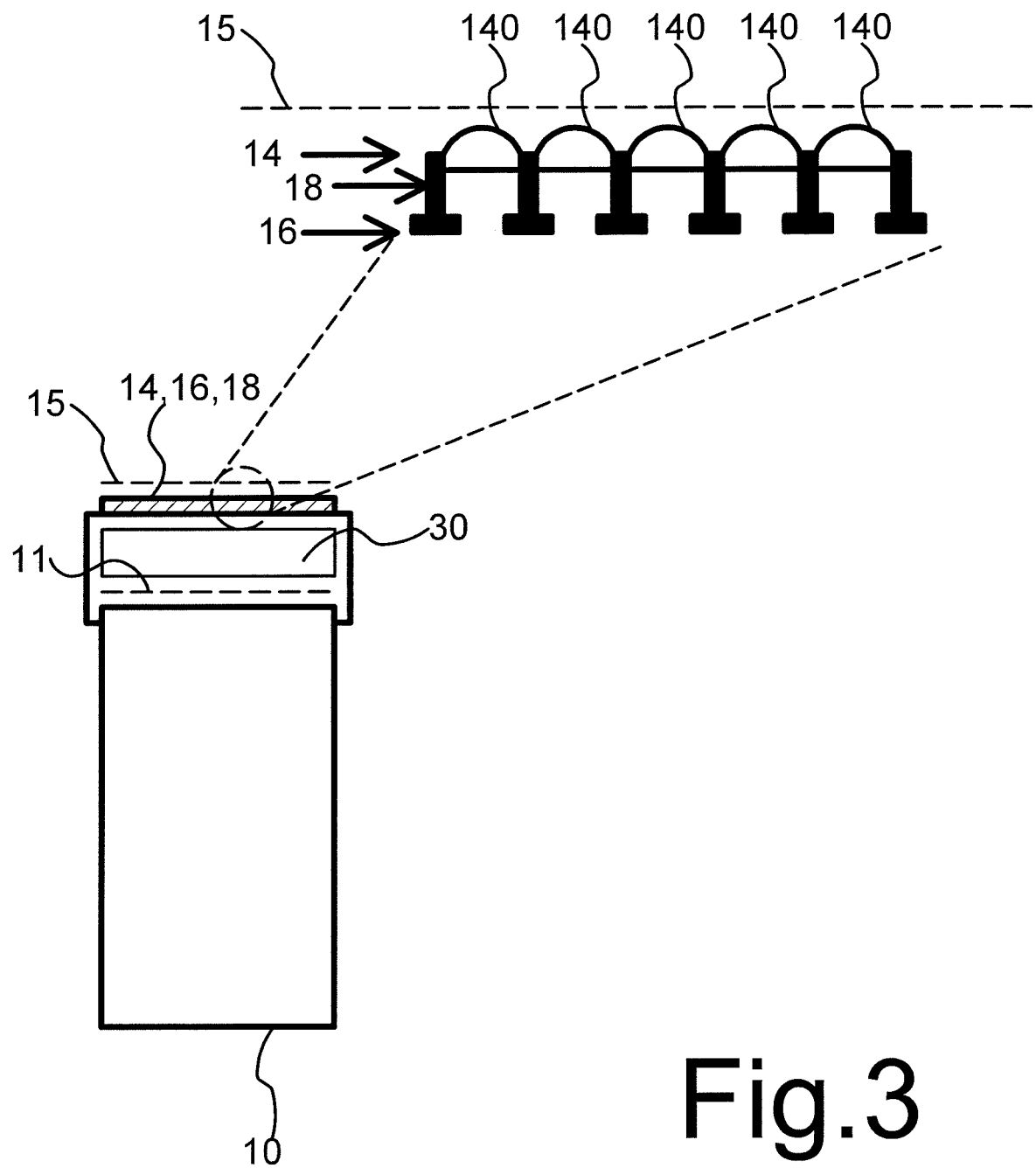
FIG. 3 shows a transmissive embodiment of the an optical diffusing light detection system

FIG. 3 shows a configuration wherein a transmissive diffuser 30 is used. Herein light from input surface 15 is transmitted to output surface successively through micro lenses, apertures and the diffuser 30. Transmissive diffusers are known per se. Frosted glass is a simple example.

As shown, transmissive diffuser 30 is located at a distance from aperture array plate 16 and hence from baffles 18 and micro lens array 14. In other words, there is a gap between aperture array plate 16 and diffuser 12 through which light propagates from the apertures in aperture array plate 16 to diffuser 12. Preferably, the distance in this gap is larger than the distance between the micro lenses 14 and the aperture array plate 16, i.e. larger than the focal distance of micro lenses 14 and preferably at least twice the focal distance or much more. The distance has the effect that light that reaches points on diffuser 30 from the apertures aperture array plate 16 is a mix of light from a plurality of different apertures in aperture array plate 16 at each of these points. Thus, also the light intensity of diffusively transmitted light from diffuser 30 at each of these points is an average of light from a plurality of apertures.

Figure 4:
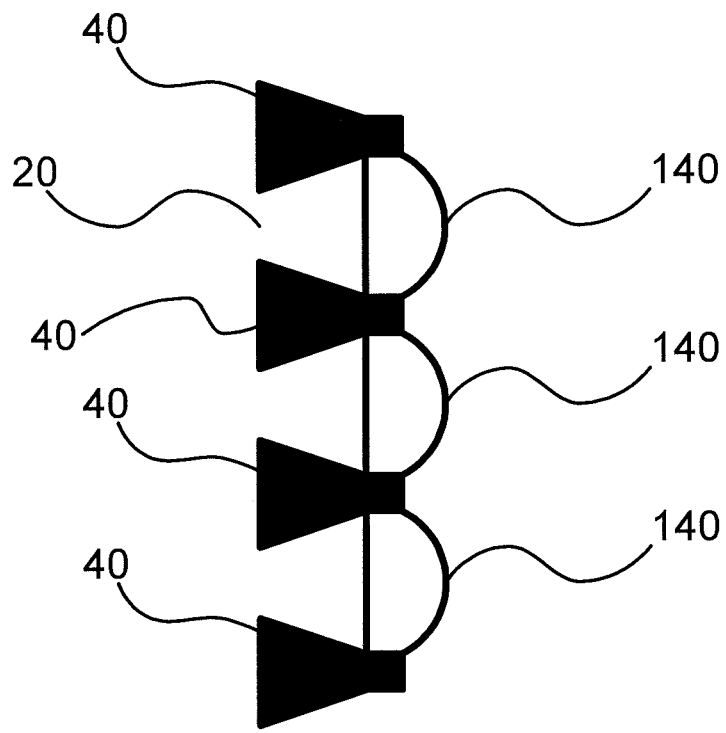
FIGS. 4, 5 show details of a micro lens array

FIG. 4 shows a detail of a further embodiment of the combination of the array of micro lenses 14, aperture plate 16 and baffles 40. Herein baffles 40 with conical openings are used, which narrow down from the perimeters of micro lenses 140 to the perimeters of apertures 20.

The cross-sections of the conical openings at different distance from apertures 20 towards micro lenses 140 may have circular shapes when apertures 20 are circular, or other shapes, e.g. rectangular, when apertures 20 are not circular. Preferably, the cross-sections of the conical openings may have the same shape as apertures 20 but with a different size over at least part of the distance, the size increasing with said distance.

An integral body may be used to form both baffles 40 and apertures 20, apertures 20 forming the end of baffles 40. This embodiment increases the robustness of the device. In a further embodiment the conical openings are filled with optically transparent material, e.g. material of the same type as micro-lenses 140. The lens material may form continuous bodies that each include a micro-lens 140 and the conical opening of the baffle behind that micro lens.

Figure 5:
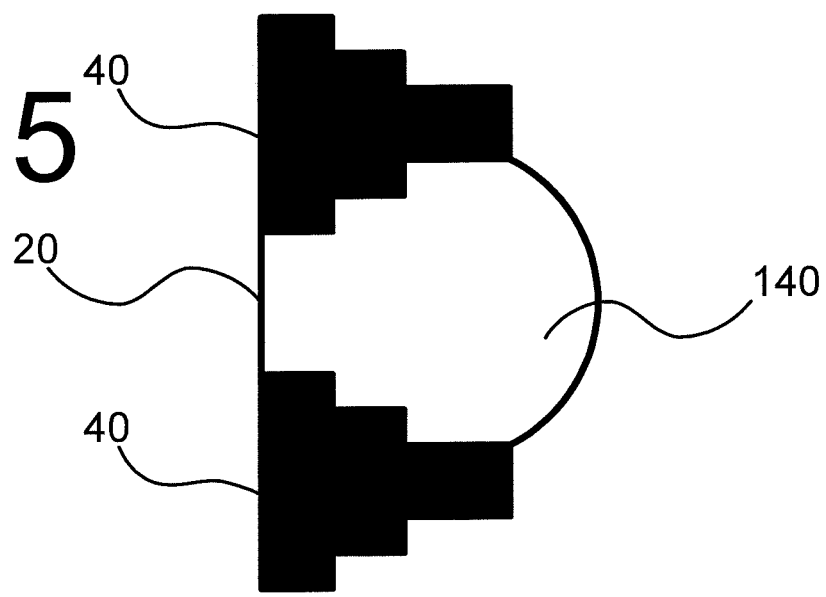

FIG. 5 illustrates an embodiment wherein the conical openings narrow down stepwise from the perimeters of micro lenses 140 to the perimeters of apertures 20. This reduces the effect of imperfect non-reflectiveness of the surface of baffles 40 on light apertures 20 back into apertures 20. In an embodiment, the width of the steps in the direction perpendicular to the optical axes of the micro lenses 140 is at least as large as their height in the direction parallel to the optical axes. This further reduces the effect of imperfect non-reflectiveness.

Techniques for manufacturing the combination of the array of micro lenses, apertures and baffles are known per se. For example, US2003067690 describes suitable techniques in the context of manufacturing an array of microscopes. Microscopes with micro lenses may have a similar structure as telescopes, except that what is the output side of a telescope is the input side of a microscope, and baffling works in the other direction.

Use of a single micro lens 140 in each telescope may give rise to chromatic errors. However, their effect is largely removed by diffuser 12. The only remaining effect may be that the optical diffusing light detection system has slightly different ranges of input angles for different color components. This is not a problem when there are no sources substantially in the direction at the edge of the range. If it is desirable to minimize this effect a plurality of layers of micro-lenses may be used to realize multi-lens telescopes with reduced chromatic errors.

In summary, an optical light diffusing system is provided, comprising an input area for receiving light and an output area for transmitting light to a light detector is provided; an optical diffuser located in an optical path from the input area to the output area; an array of micro lenses located in said optical path between the input area and the optical diffuser; an array of apertures located between the array of micro lenses and the optical diffuser, each micro lens being aligned with a corresponding one of the apertures, with an optically transparent volume between the micro lens and its corresponding one of the apertures, the apertures being located substantially in a focal surface of the array of micro lenses; optical baffles located between the array of micro lenses and the array of apertures, the optical baffles separating the optically transparent volumes between different ones of the micro lenses and their corresponding ones of the apertures.

The invention claimed is:

1. An optical light diffusing system for a light detection system, comprising
    an optical diffuser located in an optical path for transmitting received light to a light detector;
    an array of micro lenses located in said optical path located to transmit the received light towards the optical diffuser;
    an array of apertures located between the array of micro lenses and the optical diffuser, each micro lens being aligned with a corresponding one of the apertures, with an optically transparent volume between the micro lens and its corresponding one of the apertures, the apertures being located substantially in a focal surface of the array of micro lenses;
    optical baffles located between the array of micro lenses and the array of apertures, the optical baffles separating the optically transparent volumes between different ones of different ones of the micro lenses and their corresponding ones of the apertures
    wherein at least part of the apertures have rectangular shapes, with unequal width and height, and
    wherein the optically transparent volumes are conical volumes with diameters that decrease step-wise from the array of micro lenses to the array of apertures in a plurality of steps.

2. An optical light diffusing system according to claim 1, wherein the diffuser is configured to average of light from a plurality of the apertures.

3. An optical light diffusing system according to claim 1, comprising a baffle layer between the array of micro lenses and the array of apertures, the array of apertures being formed by apertures in the baffle layer, the baffle layer defining said optically transparent volumes as said conical volumes with diameters that decrease step-wise from the array of micro-lenses to the array of apertures in the focal surface of the array of micro lenses.

4. An optical light diffusing system according to claim 1, wherein the micro lenses are made of an optically transparent material, said optically transparent material extending continuously into the optically transparent volumes at least on to the optical baffles and the apertures.

5. An optical light diffusing system according to claim 1, wherein the micro-lenses have a diameter between a tenth of a millimeter and two millimeter.

6. An optical light diffusing system according to claim 1, wherein the micro-lenses and the apertures are arranged in corresponding, two dimensionally periodic arrays with pitch values between a tenth of a millimeter and two millimeter.

7. An optical light diffusing system according to claim 1, wherein there is a gap between the array of apertures and the diffuser, the gap allowing for propagation of light from the apertures before reaching the diffuser.

8. An optical light diffusing system according to claim 1, wherein the diffuser is a reflective diffuser.

9. An optical light diffusing system according to claim 1, wherein the diffuser is a transmissive diffuser.

10. An optical diffusing light detection system comprising the optical light diffusing system according to claim 1, the optical diffusing light detection system comprising a light detector facing an output area.

11. An optical diffusing light detection system according to claim 10, wherein a surface of the light detector is located in the output area.

12. An optical diffusing light detection system according to claim 10, comprising a motor driven rotatable or sliding platform for moving the combination of the diffuser, the micro lens array, the aperture array plate and the baffles into the light path to the detector.

13. A method for calibrating pixel sensitivity of pixels of a camera, the method comprising using the optical light diffusing system of claim 1 to perform the calibrating.

14. The method according to claim 13, comprising moving the combination of the diffuser, the micro lens array, the aperture array plate and the baffles into the light path to the detector.

15. An optical light diffusing system for a light detection system, comprising
    an optical diffuser located in an optical path for transmitting received light to a light detector;

an array of micro lenses located in said optical path located to transmit the received light towards the optical diffuser;

an array of apertures located between the array of micro lenses and the optical diffuser, each micro lens being aligned with a corresponding one of the apertures, with an optically transparent volume between the micro lens and its corresponding one of the apertures, the apertures being located substantially in a focal surface of the array of micro lenses;

optical baffles located between the array of micro lenses and the array of apertures, the optical baffles separating the optically transparent volumes between different ones of different ones of the micro lenses and their corresponding ones of the apertures, wherein there is a gap between the array of apertures and the diffuser, the gap allowing for propagation of light from the apertures before reaching the diffuser, and wherein a distance between the array of apertures and the diffuser through the gap is larger than a focal distance of the micro-lenses.

16. An optical light diffusing system according to claim 15, wherein the distance is larger than twice said focal distance of the micro-lenses.

17. An optical diffusing light detection system comprising an optical light diffusing system, said light diffusing system comprising an optical diffuser located in an optical path for transmitting received light to a light detector;

an array of micro lenses located in said optical path located to transmit the received light towards the optical diffuser;

an array of apertures located between the array of micro lenses and the optical diffuser, each micro lens being aligned with a corresponding one of the apertures, with an optically transparent volume between the micro lens and its corresponding one of the apertures, the apertures being located substantially in a focal surface of the array of micro lenses;

optical baffles located between the array of micro lenses and the array of apertures, the optical baffles separating the optically transparent volumes between different ones of different ones of the micro lenses and their corresponding ones of the apertures, wherein the optical diffusing light detection system comprises a light detector facing the output area, and wherein the detector is a camera or part of a camera comprising pixels.

18. An optical diffusing light detection system according to claim 17, wherein the combination of the diffuser, the micro lens array, the aperture array plate and the baffles is configured to supply light to a part of the pixels of the camera.

* * * * *